United States Patent [19]

Allcock et al.

[11] 4,387,208

[45] Jun. 7, 1983

[54] PHOSPHOROUS CONTAINING POLYMERS AS CARRIERS FOR TRANSITION METALS

[75] Inventors: Harry R. Allcock, State College; Timothy J. Fuller, Pittsburgh, both of Pa.; Thomas L. Evans, Schenectady, N.Y.

[73] Assignee: The United States of America as represented by the Secretary of the Navy, Washington, D.C.

[21] Appl. No.: 332,701

[22] Filed: Dec. 21, 1981

[51] Int. Cl.³ .............................................. C08G 79/04
[52] U.S. Cl. .................................. 528/166; 525/538; 528/167; 528/168; 528/169
[58] Field of Search ............................... 528/166–169; 525/538

[56] References Cited

U.S. PATENT DOCUMENTS

| 4,182,834 | 1/1980 | Hergenrother | 528/168 |
|---|---|---|---|
| 4,218,556 | 8/1980 | Hergenrother | 528/168 |
| 4,221,904 | 9/1980 | Hergenrother | 528/168 |
| 4,242,493 | 12/1980 | Chen et al. | 528/168 |
| 4,247,680 | 1/1981 | Hergenrother | 528/168 |
| 4,267,311 | 3/1981 | Elefritz, Jr. | 528/499 |

*Primary Examiner*—Lester Lee
*Attorney, Agent, or Firm*—Robert F. Beers; Arthur A. McGill; Prithvi C. Lall

[57] ABSTRACT

Synthesis of new (lithiophenoxy)phosphazene high polymers is described wherein polymers such as poly(dichlorophosphazene) are used as the starting material to prepare poly(organophosphazenes) by reaction thereof with sodium para-bromophenoxide. Poly(organophosphazenes) thus obtained are used in a metal-halogen exchange reaction with n-butyllithium. The lithio derivatives thus obtained are used as reactive intermediates for the synthesis of polymers of formulas $[NP(OC_6H_4X\text{-}p)_x(OC_6H_4Br)_y]_n$ and $[NP(OC_6H_4Li\text{-}p)_x(OPh)_y]_n$, where X is $PPh_2$, $PPh_2C_4H_9{}^+Br^-$, $SnPh_3$, $AuPPh_3$, or COOH.

11 Claims, 2 Drawing Figures

PHOSPHOROUS CONTAINING POLYMERS AS CARRIERS FOR TRANSITION METALS

BACKGROUND OF THE INVENTION

This invention is related to the synthesis of new polymers and more specifically to the preparation of new (lithiophenoxy) phosphazene high polymers.

The synthesis of macromolecules that can function as carrier molecules for catalysts or chemotherapeutic agents or which can selectively bind ions in aqueous media is a subject of growing importance. As an example, it is important to prevent the wastage of transition metals such as rhodium, cobalt etc. when used as catalysts in chemical reactions. Control of biological activity such as controlled use of gold in the treatment of arthritis is also important. Besides, controlled use of tin in the preparation of antifouling paint is also important. It is thus desirable to synthesize high polymers wherein transition metals are incorporated so as to obtain new polymers with the above-mentioned unique characteristics. Moreover, the synthetic pathway used should not involve cross-linking and should allow binding transition metals or provide sites for further chemical modification without interference from the polymer skeleton or from the side-group spacer units.

SUMMARY OF THE INVENTION

The objects and advantages of the present invention are accomplished by utilizing poly(dichlorophosphazene); i.e.

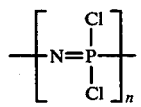

which are halogen derivatives of polymers I given by the formula

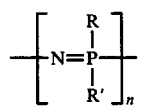

where n is the number of repetitive units present and R and R' are organic radicals. The starting material and interaction thereof with stoichiometric deficient amount of sodium p-bromophenoxide of formula

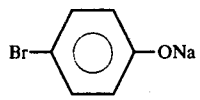

followed by treatment with an excess of sodium phenoxide of formula

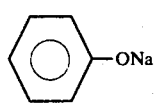

in order to obtain

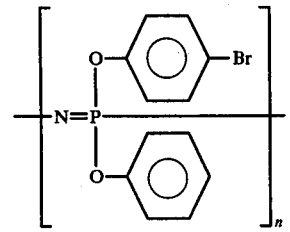

with a different ratio of para-bromophenoxy to phenoxy groups. Lithiation of the polymer so obtained is accomplished by metal-halogen exchange at −40° C. to −60° C. in tetrahydrofuran (THF) solution of excess n-butyllithium. The poly[(lithiophenoxy)phosphazenes] thus obtained is used to interact with diphenylchlorophosphine, i.e.,

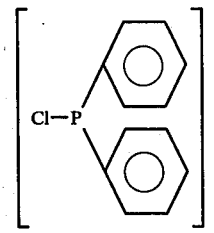

triphenyltin chloride, i.e.

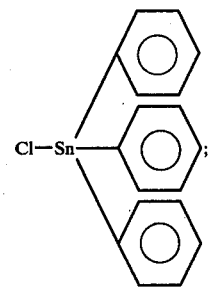

(triphenylphosphine) gold(I) chloride, i.e.

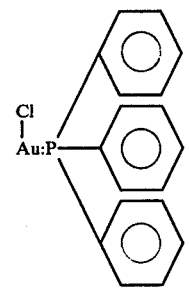

or [P Ph₃][Au Cl] or COOH were Ph is known as phenyl and designated by

and carbon dioxide, i.e. O=C=O, to obtain new polymers with the above mentioned characteristics.

An object of subject invention is to synthesize new useful polymers such as $[NP(OC_6H_4Sn\ Ph_3\text{-}p)_x(OC_6H_5)_y]_n$ using a polymer poly(dichlorophosphazene)

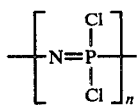

as a starting material.

Another object of subject invention is to synthesize above-mentioned polymers using metal-halogen exchange reaction.

Still another object of subject invention is to synthesize above-mentioned polymers using lithiation interaction wherein halogen atoms in the polymer are replaced by lithium atoms during interaction with n-butyllithium.

Still another object of subject invention is to synthesize above-mentioned polymers by attachment of diphenylchlorophosphine, triphenyltin, (triphenylphosphine) gold(I) or carboxylic acid groups for lithium in the polymers.

Other objects, advantages and novel features of the invention will become apparent from the following detailed description of the invention when considered in conjunction with the accompanying drawings wherein:

DESCRIPTION OF A PREFERRED EMBODIMENT

The novel features of subject invention are accomplished by illustrating the following examples of the best mode of carrying out the invention. However, it should be clearly understood that these examples should not be construed as being limitations on the scope or spirit of the invention.

According to subject invention, poly(dichlorophosphazene) is used as a starting material which acts as a carrier species. This is different from the conventional approach wherein a monomer is used to obtain the desired polymers. Organic or inorganic residues are then attached to polyphosphazene molecules. Synthesis of the new polymers such as $[NP(OC_6H_4Li\text{-}p)_x(OC_6H_4Br)_y]_n$ involves the basic step of interacting poly(dichlorophosphazene), i.e.

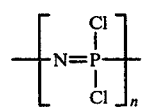

first with a stoichiometric deficient amount of sodium p-bromophenoxide, ie.

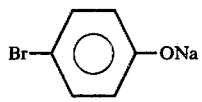

or $NaOC_6H_4Br$ followed by treatment with an excess of sodium phenoxide, i.e.

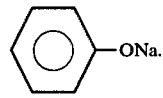

Figure 1:
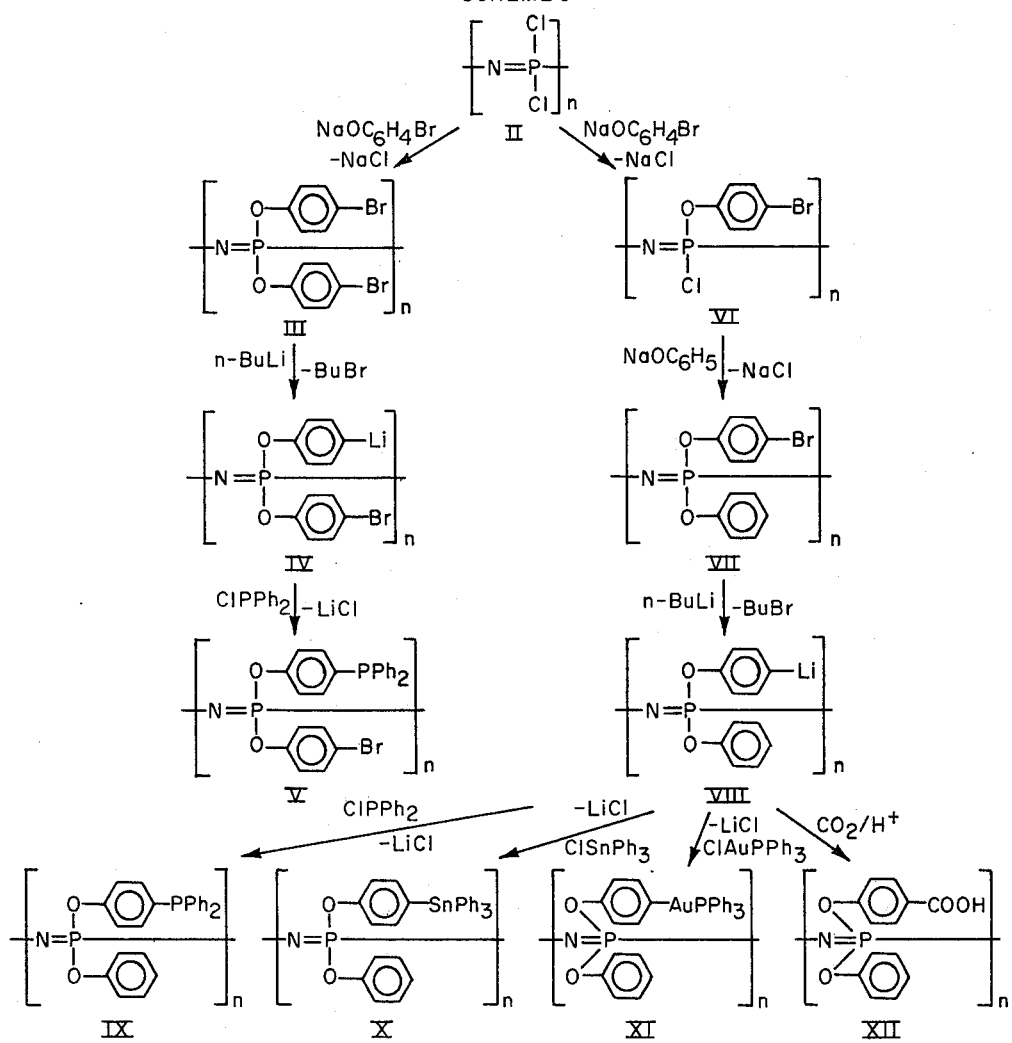
FIG. 1 shows the schematic configuration of the process of synthesizing new polymers according to the teachings of subject invention.
Figure 2:
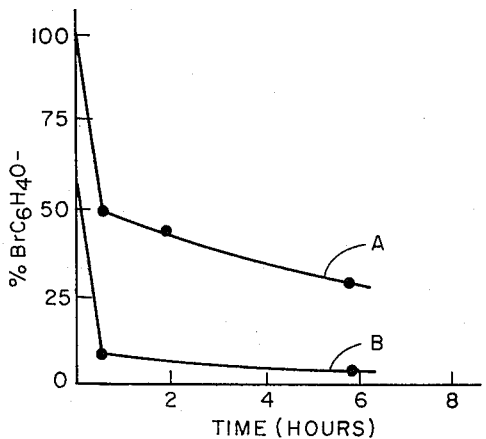
FIG. 2 is a plot of the % remaining para-bromphenoxy pendent groups as a function of time following the reaction with excess n-butyllithium for polymers that possessed initially different % of p-bromophenoxy substituent groups.

This step together with the others during the synthesis of the new polymers are shown in FIG. 1 as scheme I. The reaction sequences shown in the scheme basically involves three steps: (a) the preparation of high molecular weight polyphosphazenes shown in FIG. 1 as polymer III or polymer VII; (b) replacement of bromine atoms in III or VII by lithium with the use of a metal-halogen exchange reaction with n-butyllithium and (c) the reaction of (lithiophenoxy) phosphazenes of the type I V or VIII with electrophiles to yield substituted derivatives such as V and IX–XII. As shown in FIG. 1, the starting material designated as a compound of polymer II is treated with sodium para-bromophenoxide—$NaO\ C_6H_4Br$ which results in either polymer III or polymer VI. If two p-bromophenoxy groups are attached to the same phosphorus atom in the backbone chain, we get polymer III and if only one sodium para-bromophenoxy group attaches to a phosphorus atom in the backbone chain, we get polymer VI. As shown in FIG. 1, NaCl is eliminated from the reaction. Polymer VI can then be treated with an excess of sodium phenoxide wherein the remaining chlorine atom attached to the same phosphorus atom in the backbone chain as the sodium para-phenoxy group to produce compound or polymer VII. The interaction of compounds or polymers III and VII with n-butyllithium in tetrahydrofuran (THF) at $-40°$ C. to $-60°$ C. results in polymer IV or polymer VIII respectively. The composition of polymers IV and VIII was established by elemental microanalysis; $^{31}P$ NMR (nuclear magnetic resonance) spectroscopy and gel permeation chromatography (GPC) molecular weight determinations. These studies showed that neither chain-scission reactions nor displacement of aryl or phenyl oxide side groups occurred to a detectable degree at $-40°$ C. to $-60°$ C. Furthermore, it was also found that the lithiation of polymers III and VII proceeds in two stages as shown in FIG. 2 wherein curve A represents the rate of reaction with excess n-butyllithium for polymers that possessed initially 100% para-bromophenoxy substituent groups (i.e. polymer III) and curve B represents the rate of reaction for polymers that possess 56% para-bromophenoxy, 44% phenoxy substituent groups (i.e. polymer VIII). The percentages of residual p-bromophenoxy groups were obtained after deactivation of the lithiated derivatives with water and conversion of lithioaryl groups to aryl groups. FIG. 2 shows a dramatic decrease in lithiation rate after approximately 50% of the pendent bromophenoxy groups have reacted. FIG. 2 further shows that metal-halogen exchange process was rapid and nearly complete within 0.5 hour for polymers of type VII with less than 50% of the side groups being bromophenoxy units. Both curves A and B show that lithiation was rapid in the first 0.5 hour during which time 51% of the bromine atoms had been replaced by lithium. However, the rate of lithiation was so slow that only 18% of the remaining bromine atoms were replaced in the next 5.5 hours. This seems to suggest that the presence of one lithiophenoxy group inhibits the introduction of a second lithium atom at an aryloxy group geminal to the first (i.e. both Li atoms attached to the same phosphorus atom of a repetitive unit of the polymer). It was also observed that cross-linking takes place if the temperature of the reaction mixture raised to 25° C. Cross linking appeared to be associated with the presence of aryl-lithium bonds, as treatment of the polymer [NP(OC$_6$H$_5$)$_2$]$_n$ with n-butyllithium at $-50°$ C. and followed by warming up to 25° C. and addition of water, did not yield a cross-linked polymer. Lithiated polymers represented by type IV and VIII were reacted with electrophiles such as diphenylchlorophosphine, triphenyltin chloride, (triphenylphosphine) gold(I) chloride, or carbon dioxide to yield polymers V and IX–XII respectively.

The experimental details for synthesizing various compound according to the teachings of subject invention are as follows:

$^{31}$P NMR spectra were obtained in the Fourier transform mode at 40.4 MHZ with a JEOL PS-100 FT spectrometer and processed with a Nicolet 1080 computer. $^1$H NMR spectra were obtained with the same spectrometer operated at 100 MHz. Infrared spectra were recorded with a Perkin-Elmer Model PE 580 high-resolution infrared spectrophotometer. Approximate polymer molecular weights were determined with a Waters Associates AIC/GPC 501 instrument fitted with a 120 cm×1 cm 10$^6$ Styragel column. Glass transition temperatures (T$_g$) were measured with a Chemical Instruments Corp. torsional braid analyzer kindly provided by NASA, Langley Field. All experimental manipulations were performed under an atmosphere of dry nitrogen (Matheson). Tetrahydrofuran (THF) (Fisher) and dioxane (Fisher) were freshly distilled under dry nitrogen from sodium benzophenone ketyl. Poly(dichlorophosphazene), (NPCl$_2$)$_n$, was prepared by the melt polymerization of (NPCl$_2$)$_3$ (Ethyl Corp.) by methods described previously in the prior art. n-Butyllithium was used as received (Foote Mineral; 1.6 M solution in hexane). Phenol, p-bromophenol (Aldrich) diphenylchlorophosphine (Orgmet), triphenyltin chloride (Strem), (triphenylphosphine) gold(I) chloride (Strem), and a sodium hydride (Alfa) were used as received. The accuracy of elemental microanalyses, as determined by Galbraith Laboratories, was found to be dependent on the element that was analyzed and the composition of the polymeric compounds. Elemental analyses for bromine proved to be the most reliable indicator of polymer compositions. Furthermore, the polymers that possessed exclusively p-bromophenoxy substituent groups and those that contained only phenoxy and p-bromophenoxy substituent groups yielded the most accurate microanalytical data. The compositions of polymers that possessed phosphine residues could be determined by $^{31}$P NMR peak area integrations of the phosphazene and phosphine phosphorus resonances. The ratios of phosphazene to phosphine, as determined by $^{31}$P NMR methods, agreed to within 3% of the value determined by elemental microanalyses for bromine.

The general experimental procedure for the synthesis of polymers of types III and type VII was as follows: Sodium p-bromophenoxide was prepared by adding a solution of p-bromophenol in dioxane (100 mL of dioxane was usually employed) to a stirred suspension of a molar excess of sodium hydride and dioxane (100 mL). After 4 hours, the reaction mixture was heated to reflux and filtered. The filtrate was added to a stirred solution of poly(dichlorophosphazene) in dioxane (150 mL). The reaction mixture was stirred for 4–8 hours at 25° C. and was then added to a solution of sodium phenoxide prepared in a similar manner to the preparation of sodium p-bromophenoxide, in boiling dioxane (250 mL). The reaction mixtures were refluxed for 168 hours and concentrated by rotoevaporation, and the concentrate was added to water. The precipitate was collected, washed with ethanol, redissolved in hot tetrahydrofuran (THF) and precipitated into water. The reprecipitation procedure was carried out once from THF into water, from THF into ethanol, and from THF into pentane. The yields of the polymers represented by VII exceeded 50%. The preparation of polymer III was carried out by obtaining a solution of sodium p-bromophenoxide in dioxane, prepared by the method described above, was heated to reflux and filtered into a reaction vessel (three-necked, 1-L capacity). A solution of poly(dichlorophosphazene) in dioxane (150 mL) was added dropwise to the sodium p-bromophenoxide solution at reflux. The reaction mixture was heated at reflux for 168 hours and concentrated by rotoevaportion, and the concentrate was added to water. The precipitate was washed with ethanol and an unsuccessful attempt was made to dissolve the polymer in tetrahydrofuran. The polymer was recovered from tetrahydrofuran by filtration and then dissolved in boiling dioxane. The hot solution was filtered and reprecipitated into water. The recovered polymer was redissolved in boiling dioxane and reprecipitated once again into water. The polymer was further reprecipitated from dioxane into ethanol and then from dioxane into pentane. The yield of III was 30%.

[NP(OC$_6$H$_5$)$_2$]$_n$ was prepared by adding dropwise a solution of phenol (33 g, 0.35 mol) in dioxane (100 ml) to a stirred suspension of sodium hydride (17 g, as a dispersion in oil) and dioxane (100 ml). The reaction mixture was boiled at reflux to ensure complete reaction. The hot reaction mixture was filtered and the filtrate was added to a reaction vessel (three-necked, 1-L capacity). To this boiling solution was added dropwise a solution of poly(dichlorophosphazene) 4.0 g, 0.035 mol) in dioxane (200 ml). The reaction mixture was then refluxed for 168 hours, concentrated by rotoevaporation, and added to water. The precipitate was collected, washed with ethanol, and redissolved in hot THF, and the polymer was reprecipitated into water once again. Reprecipitations were carried out from THF into water for a third time and from THF into ethanol. The yield of [NP(OC$_6$H$_5$)$_2$]$_n$ was over 50%.

Polymers with p-lithiophenoxy substituent groups were prepared by reacting III or VII with n-butyllithium. A general procedure for the metal-halogen exchange reactions with VII or III was as follows: The polymers VII (with 5, 20, and 35% p-bromophenoxy groups) were dissolved in THF (200 mL). Polymers III and VII (56% bromophenoxy groups) required a two-step procedure that involved the use of boiling dioxane, removal of the dioxane by means of a rotary evaporator, and treatment with THF (200 mL). When this procedure was employed, THF-soluble forms of III and VII (56% bromophenoxy) could be obtained. The solutions of III and VII in THF were cooled to $-40°$ C. to $-60°$ C. by means of a dry ice-acetone bath (before this step, the reaction vessels were fitted with a rubber septum). n-Butyllithium (4–6 mL) was then added to the polymer solutions via syringe. This resulted in the immediate formation of yellow or green reaction mixtures. Reaction times with n-butyllithium were in the range of 0.5–6 hours (the most commonly employed reaction time was 0.5 hour). The lithiated derivatives were deactivated by treatment with water, diphenylchlorophosphine, carbon dioxide, triphenyltin chloride, or (triphenylphosphine) gold(I) chloride. These reaction procedures are discussed in the following sections.

The lithiated derivatives that were prepared by metal-halogen exchange reactions of n-butyllithium with polymers III or VII (5, 20, 35, and 56% p-bromophenoxy groups) were characterized after their deactivation with water. The specific experimental details involved in these reaction sequences are listed in Table VI. The deactivations of the lithiated intermediates were carried out by the addition of water (by syringe) to the reaction mixtures at $-40°$ C. to $-60°$ C. After the addition of water, the reaction mixtures were allowed to warm to 25° C. The polymeric products were isolated by filtration and purified by reprecipitations from THF into water, from THF into ethanol, and from THF into pentane.

Metal-halogen exchange reactions were carried out on polymers III or VII (5, 20, 35, and 56% p-bromophenoxy groups; circa of 0.5 gram (or 0.5 g) of polymer III or VII which is approximately 0.02 mol and excess amount of n-butyllithium). The resultant lithiated intermediates were deactivated with an excess amount of diphenylchlorophosphine. Diphenylchlorophosphine was added via syringe to the reaction mixture at $-40°$ C. to $-60°$ C. The low reaction temperatures were maintained for 3 hours, and the reaction mixture was then allowed to warm to 25° C. Ethanol (100 mL) was added to the reaction mixture which was then concentrated by rotoevaporation until the polymer precipitated from solution. The polymeric precipitate was collected by filtration, washed with ethanol, dissolved in THF, and precipitated into ethanol. Reprecipitation was carried out from THF into ethanol for a second time and then from THF into pentane. Microanalytical data and $T_g$ data were obtained for the series of polymers prepared by this general method. The $^{31}p$ NMR spectra of the polymers that possessed pendent phosphine residues consisted of a resonance at $-20$ ppm (phosphazene phosphorus), a resonance at $-8$ ppm (phosphine phosphorus), and a small resonance at $+22$ to $+24$ (assigned to pendent butylphosphonium bromide residues). These spectra were referenced to an external $H_3PO_4$ sample and employed a $D_2O$ capillary lock. The integrated peak areas of these polymers were used as a method for the determination of polymer compositions.

Synthesis of new polymers according to the teachings of subject invention will now be illustrated by the following examples:

EXAMPLE 1

Synthesis of $[NP(OC_6H_4Sn(C_6H_5)_3-p)_{0.7}(OC_6H_5)_{1.3}]_n$ (X)

A sample of $[NP(OC_6H_4Br-p)_{0.7}(OC_6H_5)_{1.3}]_n$, VII (35% bromophenoxy groups) 0.5 g, 0.0017 mol), was dissolved in THF (350 mL). The solution was then cooled to $-60°$ C. and n-butyllithium (5 mL, 0.008) was added. The reaction mixture was stirred for 1 hour at $-60°$ C., and a solution of triphenyltin chloride (6.5 g, 0.017 mol) in THF (75 mL) was added. The reaction mixture was stirred at $-60°$ C. for 3 hours, allowed to warm to 25° C., and stirred for 14 hours. The reaction mixture was concentrated by rotoevaporation and reprecipitated into a dilute aqueous HCl solution. The polymeric product was collected by filtration and then reprecipitated from THF into water and from THF into n-pentane. The product showed a low solubility in THF. Microanalytical data were consistent with the formula $[NP(OC_6H_4Sn(C_6H_5)_3-p)_{0.7}(OC_6H_5)_{1.3}]_n$.

EXAMPLE 2

Synthesis of $[NP(OC_6H_4AuP(C_6H_5)_3-p)_{0.52}(OC_6H_5)_{1.48}]_n$ (XI)

A sample of $[NP(OC_6H_4Br-p)_{0.7}(OC_6H_5)_{1.3}]_n$, VII (35% bromophenoxy groups) (0.5 g, 0.0017 mol), was dissolved in THF (200 mL). This solution was then cooled to $-60°$ C. and n-butyllithium (0.6 mL, 0.0010 mol) was added. The reaction mixture was stirred for 1 hour at $-60°$ C., and a solution of (triphenylphosphine) gold(I) chloride (0.50 g, 0.0010 mol) in 25 mL of THF was added. The reaction mixture was stirred for 3 hours at $-60°$ C., allowed to warm to 25° C., and stirred for 1 hour. Water (0.5 g, 0.028 mol) was added, the reaction mixture was concentrated by rotoevaporation, and the mixture was filtered. The filtrate was added to n-pentane and the precipitate was collected. A $^{31}p$ NMR spectrum of the product showed resonances at $+33$ and $-20$ ppm, assigned to phosphine and phosphazene phosphorous atoms, respectively. The integrated areas for these resonances were consistent with the formula $[NP(OC_6H_4AuP(C_6H_{53}-p)_{0.52}(OC_6H_5)_{1.48}]_n$. Solutions of XI in THF showed signs of decomposition (purple color formation) after only 3 hours in air. $C_6H_5AuP(C_6H_5)_3$ and the cyclic phosphazene $[NP(OC_6H_4AuP(C_6H_5)_3-p)_2]_3$ showed no decomposition in the solid state. (These compounds were only slightly soluble in THF. Hence, their solution stability could not be evaluated).

EXAMPLE 3

Synthesis of $[NP(OC_6H_4COOH-p)_{0.7}(OC_6H_5)_{1.3}]_n$ (XII)

A sample of $[NP(OC_6H_4Br-p)_{0.7}(OC_6H_5)_{1.3}]_n$ VII (35% bromophenoxy groups) 0.5 g, 0.0017 mol), was dissolved in THF (300 mL). The solution was cooled to $-60°$ C. and n-butyllithium (5 mL, 0.008 mol) was added. The reaction mixture was stirred for 1 hour at $-60°$ C. and then added to a large excess of dry ice in a nitrogen-filled glovebag. The reaction mixture was allowed to warm to 25° C. (in a nitrogen atmosphere), and the white polymeric product was collected by filtration. This was then stirred in an aqueous solution of HCl for 20 minutes and was once again collected by filtration. This compound proved to be insoluble in THF, boiling dioxane, ethanol, water (pH 7 to 12), or a THF solution that contained 20 or 50% (by volume) of triethylamine. The infrared spectrum of the polymeric product suggested the presence of carboxylic acid functions (OH stretch at 330 cm$^{-1}$ and C=O stretch at 1750 cm$^{-1}$). Microanalysis of this compound was consistent with the formula $[NP(OC_6H_4COOH-p)_{0.7}(OC_6H_5)_{1.3}]_n$.

In a similar manner, the derivative $[NP(OC_6H_4COOH-p)_{1.42}(OC_6H_4Br-p)_{0.58}]_n$ was prepared by the interaction of $(OC_6H_4Br-p)_2]_n$ (III) (0.5 g, 0.0013 mol) with n-butyllithium (4 mL, 0.0064 mol) for 6 hours, followed by treatment with carbon dioxide.

EXAMPLE 4

Synthesis of [NP(OC$_6$H$_4$Br-p)$_{0.05}$(OC$_6$H$_4$P(C$_6$H$_5$)$_2$(C$_4$H$_9$)+Br−-p)$_{0.65}$(OC$_6$H$_5$)$_{1.30}$]$_n$ A sample of [NP(OC$_6$H$_4$Br-p)$_{0.050}$(OC$_6$H$_4$P(C$_6$H$_5$)$_2$-p)$_{0.626}$(OC$_6$H$_4$P(C$_6$H$_5$)$_2$(C$_4$H$_9$)+Br-p)$_{0.024}$(C$_6$H$_5$)$_{1.30}$]$_n$ (0.5 g, 0.0014 mol), prepared from the reaction of VII (35% bromophenoxy) with n-butyllithium, followed by treatment with diphenylchlorophosphine was dissolved in THF (200 mL), and an excess of n-butyl bromide (2 g, 0.014 mol) was added. The reaction mixture was stirred for 1 hour at 25° C., and ethanol (300 mL) was added. The reaction mixture was evaporated to dryness in a rotary evaporator. The polymeric product was purified by reprecipitations from THF into water and from THF into ethanol. The polymer showed only two $^{31}$p NMR resonances at +24 (phosphonium salt phosphorus) and −20 ppm (phosphazene phosphorus). No resonance at −8 ppm (part per million) (phosphorus) could be detected from this sample. $^{31}$p NMR peak area integrations were consistent with the polymer structure [NP(OC$_6$H$_4$Br-p)$_{0.50}$(OC$_6$H$_4$(C$_6$H$_5$)$_2$(C$_5$H$_9$)+Br−-p(0.65−(OC$_6$H$_5$)$_{1.30}$]$_n$. The results of this experiment support the contention that pendent phosphonium bromide salt formation is a consequence of the reaction of pendent phosphine residues with butyl bromide (generated in the exchange process) during the purification of the polymer reaction mixtures.

The preceeding examples can be reached with similar success by substituting the generically or specifically described reactants under/or operating conditions of the invention for those used in the preceeding examples.

From the foregoing description, one skilled in the art can easily ascertain the essential characteristics of this invention without departing from the spirit and scope thereof, can make various changes and modifications of the invention to adapt it to various usages and conditions. It is therefore understood that within the scope of the appended claims the invention may be practiced otherwise than as specifically described.

What is claimed is:

1. A process for synthesizing new high polymers using poly(dichlorophosphazene) as the starting material comprising the steps of:
   preparing high molecular weight poly-phosphazenes by reacting a solution containing 4.0 g (0.035 mol) of poly(dichlorophosphazene) in 200 mL of dioxane at 25° C. with sodium para-bromophenoxide obtained by adding dropwise bromophenol solution containing 33 g (0.35 mol) bromophenol in 100 mL of dioxane to stirred suspension of 17 g of sodium hydride in 100 mL of dioxane and sodium phenoxide;
   replacing bromine atoms of said high molecular weight polyphosphazenes by reaction thereof with excess amount of n-butyllithium solution in dioxane to obtain (lithiophenoxy)phosphazenes at temperature between −40° to −60° C.; and
   reacting said lithiophenoxy phosphazenes with an electrophile to obtain said new high polymer.

2. The process of claim 2 wherein the step of preparing high molecular weight poly-phosphazenes includes reaction poly(dichlorophosphazene) with a stoichiometric deficient amount of sodium para-bromophenoxide.

3. The process of claim 2 wherein the step of preparing high molecular weight poly-phosphazenes includes treating of poly (dichlorophosphazenes) with an excess amount of sodium phenoxide after treatment thereof with a stoichiometric deficient amount of sodium para-bromophenoxide.

4. The process of claim 3 wherein the step of interacting said high molecular weight poly-phosphazenes with n-butyllithium uses excess amount of n-butyllithium in dioxane solution.

5. The process of claim 4 wherein the step of interacting said high molecular weight poly-phosphazenes with an excess amount of n-butyllithium is carried out at a temperature between −40° C. and −60° C.

6. The process of claim 5 wherein the step of reacting said lithiophenoxy phosphazenes includes using a solution of diphenylchlorophosphine as said electrophile.

7. The process of claim 5 wherein the step of reacting said lithiophenoxy phosphazenes includes using a solution of 6.5 g triphenyltin chloride in 75 mL of tetrahydrofuran at −60° C. as said electrophile.

8. The process of claim 5 wherein the step of reacting said lithiophenoxy phosphazenes includes using a solution of 0.5 g of (triphenylphosphine) gold(I) chloride in 25 mL of tetrahydrofuran at −60° C. as said electrophile.

9. The process of claim 5 wherein the step of reacting said lithiophenoxyphosphazenes includes using aqueous solution of HCl and carbon dioxide as said electrophile.

10. A polymer having the formula:

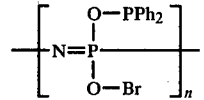

where N, P, O, Br represent nitrogen, phosphorous, oxygen and bromine atoms respectively and Ph designates a phenyl group and n is the number of repetitive units.

11. A polymer having the formula:

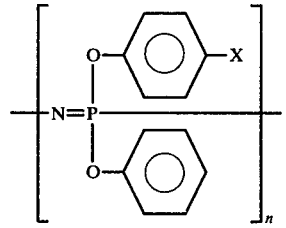

where X is a member of subgroup consisting of PPh$_2$, SnPh$_3$, AuPPh$_3$ and COOH and n is the number of repetitive units.

* * * * *